July 13, 1943.   J. DUSEVOIR   2,324,373
CRANKSHAFT
Filed Sept. 1, 1942   2 Sheets-Sheet 2
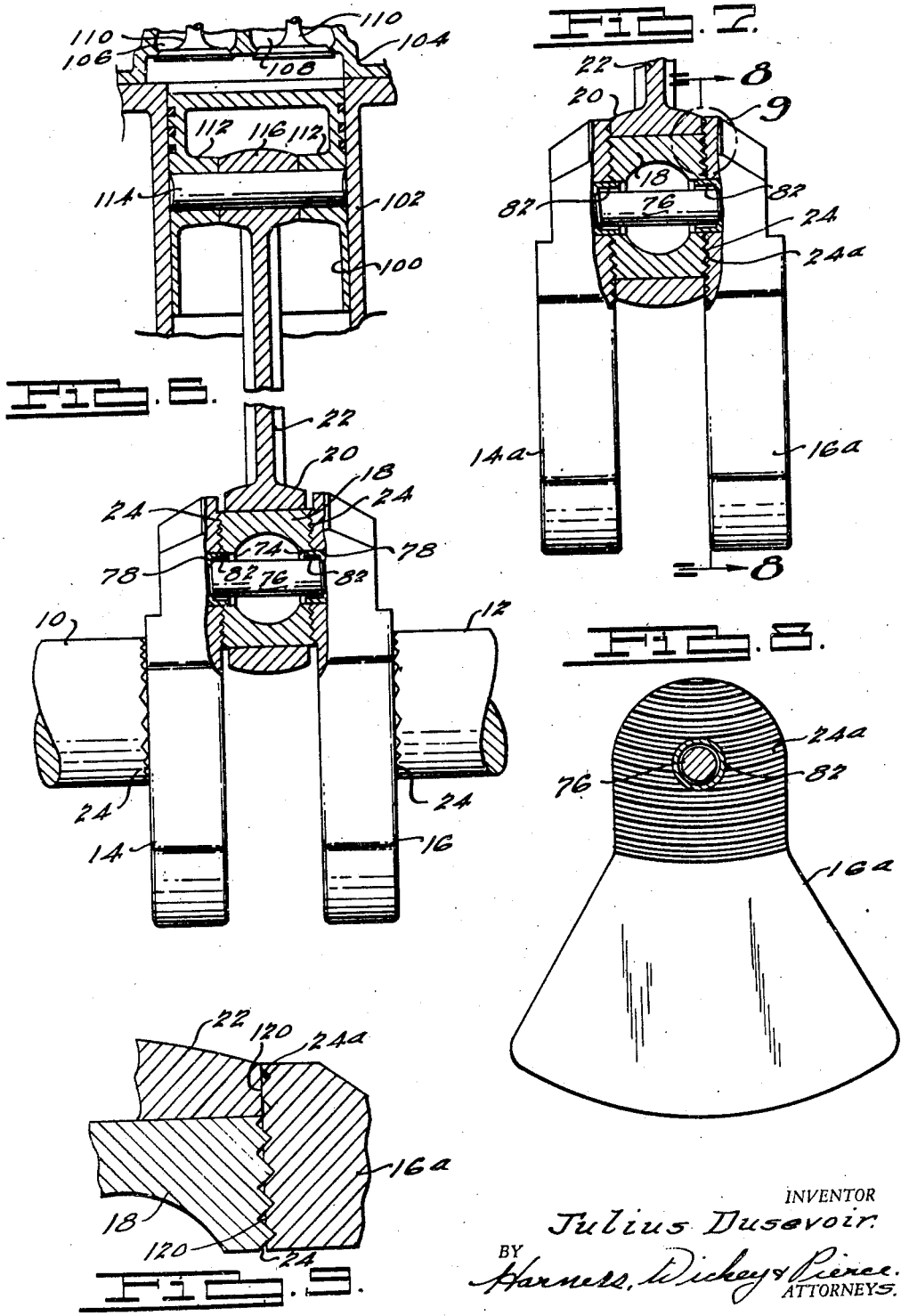
INVENTOR
Julius Dusevoir.
BY Harness, Dickey & Pierce
ATTORNEYS.

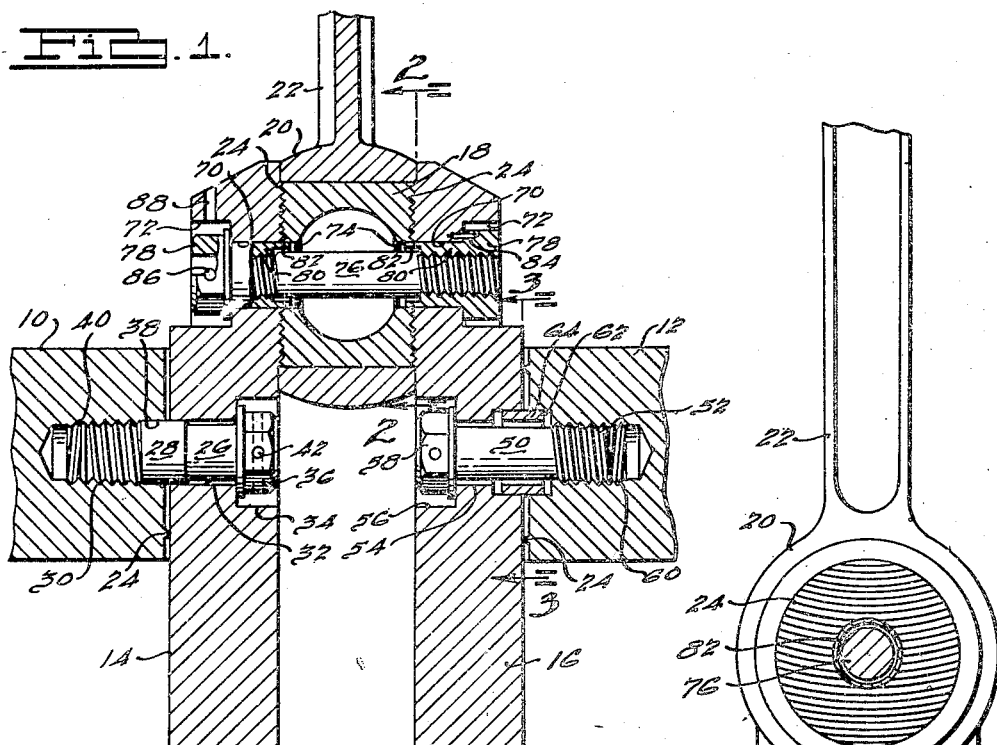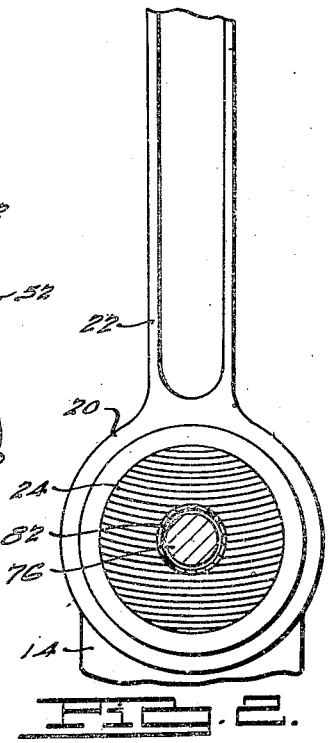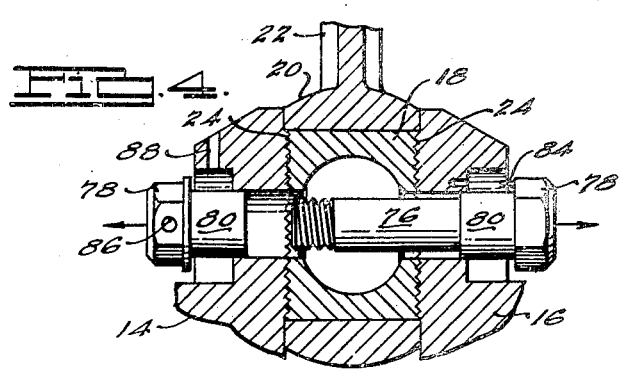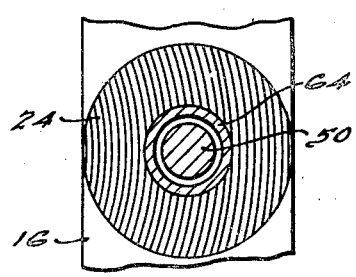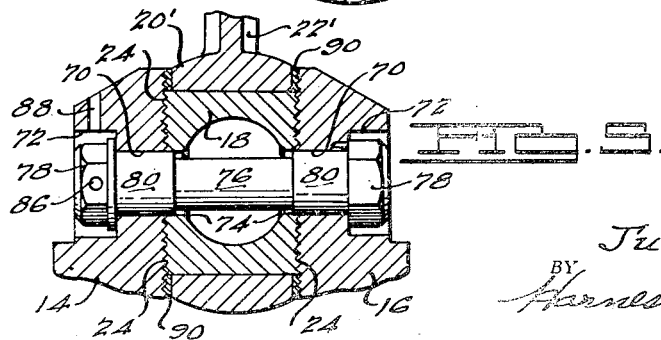

Patented July 13, 1943

2,324,373

UNITED STATES PATENT OFFICE 2,324,373

CRANKSHAFT

Julius Dusevoir, Dearborn, Mich., assignor to Century Motors Corporation, Dearborn, Mich., a corporation of Michigan Application September 1, 1942, Serial No. 456,843

14 Claims. (Cl. 74—598)

This invention relates to built-up crankshafts for use in internal combustion or other engines, compressors, or the like, and is a continuation in part of my application for Letters Patent of the United States for improvements in Crankshaft, filed July 31, 1941, and serially numbered 404,756. Although in its broader sense, the form of connection employed for connecting the various parts of the crankshaft together is applicable for other uses, the principal object is the provision of a built-up crankshaft of new and novel construction and to a form of connection for use therein.

Objects of the invention include the provision of means for coupling a pair of members together, including complementary and interfitting serrations formed in opposed faces thereof, together with a yieldable sleeve cooperating between the opposed faces to properly locate one with respect to the other; and the provision of a pair of elements having abutting faces adapted to be fixed against relative movement with respect to each other in service, the abutting faces being provided with complementary serrations interfitting one another to prevent relative rotation between them, together with means for locking the two elements together against relative movement in the direction of the serrations including a yieldable sleeve fitted within concentric openings of the two elements.

Other objects of the invention include the provision of a crankshaft comprising a plurality of separable parts connected together in a new and novel manner; the provision of the crankshaft in which the crank pins are removable from the throws without requiring removal of the remaining portions of the crankshaft from the engine or other device in which it is mounted; the provision of a crankshaft in which the throws are removable from the main journals; the provision of a construction as above described in which the throws may be removed from the journals without disassembling the journals from the engine or other object in which they are assembled; the provision of a crankshaft comprising removably associated parts permitting the use of associated connecting rods having unsplit ends engaging the crank pins thereof; the provision of a crankshaft having replaceable crank pin portions enabling the wear occurring between the connecting rods and the crank pins to be compensated for by replacement of the crank pin portions of the crankshaft without disassembly of the remaining parts of the crankshaft from an associated engine; the provision of a crankshaft construction having a crank pin that may be removed without substantially disturbing the remaining portions of the crankshaft and parts carried thereby whereby a connecting rod and its associated piston and crank pin may be removed from the engine without disturbing any other connecting rod and its associated piston and crank pin; the provision of a crankshaft in which the main journals, the throws and the crank pins are all separately formed and removably secured together in such a manner as to permit the assembly and disassembly of the crankshaft in an engine having solid bearings; the provision of a crankshaft as above described employing a novel form of connection between the various separable parts thereof; and the provision of a crankshaft as above described in which the crank pins are formed of a metal favorable for direct reception of the metal from which the associated connecting rods are formed without the employment of additional bearing elements.

The above being among the objects of the present invention the same consists of certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several views, Fig. 1 is a sectional view taken axially through a fragment of a crankshaft constructed in accordance with the present invention;

Fig. 2 is a fragmentary transverse sectional view taken from line 2—2 of Fig. 1 and showing the crank pin in end view to better illustrate the use of the serrations thereon;

Fig. 3 is a fragmentary transverse sectional view taken from line 3—3 of Fig. 1 to better illustrate the serrations employed on the end face of one of the crank throws;

Fig. 4 is a fragmentary view taken in the same plane as Fig. 1 to better illustrate the method of assembling and disassembling the crank pin from the throw;

Fig. 5 is a view similar to Fig. 4 but illustrating the slightly modified form of construction;

Fig. 6 is a more or less diagrammatic, fragmentary, partially sectioned view illustrating a crankshaft constructed in accordance with the present invention connected by a connecting rod to a piston operating in the cylinder of an internal combustion engine, the connection between the connecting rod and piston being relied upon to maintain the connecting rod centrally of its associated crank pin and the crank pin being removable from between its cooperating throws without the necessity of separating the throws;

Fig. 7 is a view similar to Fig. 1 showing another modified form of crankshaft construction in which the crank pin may be removed from between its cooperating throws without separating such cooperating throws;

Fig. 8 is a transverse sectional view taken on the line 8—8 of Fig. 7 and illustrating the arrangement of the serrations employed on the throws for cooperation with the crank pin; and, Fig. 9 is an enlarged fragmentary, sectional view of that portion of Fig. 7 contained within the circle 9 thereof, in order to better bring out the particular type of serrations there employed.

In my United States Letters Patent No. 2,013,039, issued September 3, 1935, on Crankshaft, I disclosed a crankshaft for an internal combustion or other engine formed of a plurality of separately formed and separable parts, which parts are connected together in a novel manner including the use of complementary and interfitting serrations formed on the abutting faces of the various connected parts. The particular type of joints disclosed in said prior patent, as in the present case, is applicable for use in parts other than crankshaft parts. The particular type of joint here employed being particularly adaptable for use in connecting the various parts of a multi-part of a crankshaft together and involving certain additional inventive features in so doing, the description of the present invention herein will be limited to crankshafts, the application of the particular type of joint employed being thereby made clear to those skilled in the art in its application to other uses.

In my prior patent above identified the crankshaft was made up of separately formed and separable parts but each part included one throw of the crankshaft and a portion of the associated crank pin and the main journal. While the crankshaft thus formed is entirely satisfactory it must be assembled in an engine in the same general manner as a conventional one-piece crankshaft, although it does enable the use of solid end connecting rods in association therewith. My prior patent above identified does, however, prohibit the use of solid bearings on both the crank pins and main journals, whereas the ability to do so would be of great importance particularly under certain conditions and in certain designs. Furthermore, in my prior patent in splitting the crank pins midway the length of each thereof requires the crankshaft to be removed from the engine before disassembling the connecting rods therefrom thereby preventing a single piston and connecting rod from being removed from the engine without removing all of them.

In accordance with the present invention a crankshaft built up from separately formed pieces or parts is provided and is so constructed and arranged that solid bearings may be employed both for the crank pins and the main journal. This is accomplished by making the crank pin portions of the crankshaft and the main journal portion of the crankshaft separable from the throw portions thereof. Thus with this construction it is possible to use solid bearings both for the main journals and for connecting rods for the crank pins and permits, in a multi-cylinder engine one connecting rod and associated piston to be removed from the engine without disturbing the remainder thereof, thus providing the same advantage from a servicing standpoint in a solid bearing engine as is now obtained in a split bearing engine.

The crank pins themselves being separately removable from the remaining portion of the crankshaft, it further permits the crank pins being formed from a material having suitable antifriction characteristics for direct contact with the material from which the connecting rods are made, thereby eliminating the necessity of employing separately formed bearings in the connecting rods for the crank pins and permitting the replacement of the crank pins themselves, when worn, with new crank pins to take up the wear between each original crank pin and its associated connecting rod. In other words, and as a matter of illustration only, where the connecting rods are formed of steel, for instance, the associated crank pin may be formed of bronze or other suitable metal adapted for direct reception in the bore of the big end of the connecting rod and directly in contact with the steel thereof.

Referring now to the accompanying drawings and particularly to Figs. 1 to 4 thereof, a portion of the crankshaft is shown as including main journal portions 10 and 12, cooperating separately formed throw portions 14 and 16, respectively, and a crank pin portion 18 interconnecting the throws 14 and 16. It will be appreciated that the remainder of the crankshaft where of a multiple throw type will be built up in the same general manner as the portion shown in Fig. 1. The crank pin portion 18 receives the big end 20 of a connecting rod 22 thereon, the big end 20 being of the so-called solid or unsplit type which is capable of use in connection with this type of crankshaft. It will also be appreciated that the bearings (not shown) for the journals 10 and 12 may also be of the solid or unsplit type.

In accordance with the present invention the journal 10 is connected to the throw 14, the journal 12 to the throw 16 and the crank pin 18 to the throws 14 and 16 by the same general form of connection or coupling as disclosed in my prior patent above identified. In other words these various parts are arranged with abutting surfaces or faces which are formed to provide complemental and interfitting serrations indicated generally at 24. These interfitting serrations 24 positively lock the cooperating parts against relative rotation with respect to each other as will be readily appreciated and therefore effectively lock the various parts of the crankshaft together to resist the torque transmitted from one end of the crankshaft to the other. Although the serrations 24 may be of a straight character, they are preferably curved as shown and are preferably struck on an arc greater than the diameter of the matching faces in which they are formed. It will also be appreciated that the serrations 24 between the crank pins 18 and throws 14 and 16 are preferably struck on an arc which is not concentric with the axis of the main journals 10 and 12. In fact and as shown in Fig. 2 the serrations between the crank pin 18 and the throws 14 and 16 are preferably struck from a center positioned outwardly of the crank pin 18 from the journals 10 and 12. By so striking the arc of the serrations 24 the force of a piston acting through the connecting rod 22 has less tendency to cause the crank pin 18 to slip in the direction of the serrations.

In a broader sense of the present invention any suitable form of means for securing the various separately formed parts of the crankshaft together against axial separation in service may be employed as long as such means cooperate between the connecting parts to maintain them against lateral slippage in the direction of the serrations, such means, of course, being removable so as to permit the various parts of the crankshaft to be disassembled one from the other. For instance, the particular means employed for connecting the throw 14 to the journal 10 comprises a bolt 26 having an enlarged cylindrical body portion 28 and a threaded end 30. The throw 14 is provided with a cylindrical bore 32 on the axis of the crankshaft which bore is enlarged at its outer end to provide a recess 34 for complete reception of the head 36 of bolt 26. The cooperating end of the main journal 10 is provided with a bore 38 of the same diameter as the bore 32 and concentric therewith which inwardly of the journal 10 joins the threaded bore 40. The bolt 26 extends through the bore 32 of the throw 14 and the bore 38 in the journal 10 and is threaded into the bore 40 of the journal 10 with the enlargement 28 so positioned as to be partially received in both the bore 32 of the throw 14 and the bore 38 of journal 10. The enlargement 28 being of a size to accurately fit such bores it effectively locks the journal 10 and throw 14 from relative movement in the direction of the length of the serrations 24 between the matching faces thereof. Relative lateral movement of these parts in a direction perpendicular to the length of the serrations 24 will, of course, be effectively prevented by the inter-engagement of the serrations 24. If desired the head 36 of the bolt 26 may be provided with a transverse opening such as 42 therein for reception of a suitable cotter pin, lock wire, or the like cooperating with the throw 14 to prevent possible loosening of the bolt 26 in service.

The type of connection shown and described between the journal 10 and throw 14, of course, requires absolute alignment of both the cooperating serrations 24 and bores 32 and 38, particularly where the enlarged portion 28 of the bolt 26 is an extremely close fit in the bores 32 and 38 as is, of course, desirable. The construction shown for connecting the journal 12 to throw 16 is preferably in accordance with a more limited phase of the present invention inasmuch as it eliminates the need of such close relative alignment between the bores and the serrations. Referring to this part of the construction as shown, it will be noted that the bolt 50 herein employed terminates in a threaded end portion 52 of larger diameter than the shank portion thereof. The throw 16 is provided with a bore 54 in which the shank of the bolt 50 is loosely received and its outer end is enlarged as at 56 for complete reception of the head 58 of the bolt 50.

The journal 12 is provided with a threaded bore 60 for reception of the threaded end 52 of the bolt 50. The opposed ends of the bores 54 and 60 are concentrically enlarged as at 62 and received in such enlargement of both bores in closely fitting relation therein is a metal sleeve 64 loosely surrounding the bolt 50. Thus in this case the sleeve 64 serves to maintain the position of the journal 12 with respect to the throw 16 longitudinally of the serrations 24 between them and the bolt 50 simply serves to maintain the journal 12 and the throw 16 against axial separation so as to permit the cooperating serrations 24 between them to prevent relative rotation between them and transmit the torque through them.

In accordance with a more limited phase of the present invention the sleeve 64 is preferably made sufficiently thin as to be somewhat flexible or yieldable diametrically thereof so that in event the serrations 24 between the journal 12 and the throw 16 are perfectly seated one in the other, should the enlarged portions 62 of the bores 54 and 60 be slightly out of axial alignment, the sleeve 64 may yield to accommodate such slight mis-alignment. I have found that this type of construction is preferable from a manufacturing standpoint and is not at all detrimental as far as the desired and required strength of the joint is concerned.

In order to hold the crank pin 18 against lateral displacement along its associated serrations 24 and to clamp it between the throws 14 and 16, the following construction is shown employed by way of example. The throws 14 and 16 concentrically with the crank pin 18 are provided with cylindrical bores 70 recessed at their outer end as at 72. The crank pin 18 may be centrally hollowed out as indicated and provided with a central bore 74 in each end thereof of the same diameter as the bores 70. A stud 76 is projected through the crank pin 18 with its opposite threaded ends lying within the bores 70 and the enlargement 72. A nut 78 is threaded onto each end of the stud 76 and is received in the corresponding recess or enlargement 72. The nuts 78 each have an inwardly extending internally threaded collar portion 80 which is closely received by the bore 70 of the corresponding throw 14 or 16 and projects therethrough and partially into the corresponding bore 74 of the crank pin 18. This sleeve portion 80, therefore, serves, when in assembled position, to positively lock the crank pin 18 against lateral displacement with respect to the associated throw 14 or 16 in the direction of the length of the serration 24, while the inter-engagement of the serration 24, of course, locks the crank pin 18 from moving in a direction perpendicular to the length of the serrations. In order to obtain the same beneficial effects as the employment of the sleeve 64 previously described, the inner ends of the sleeve portions 80 of the above described nuts 78 are internally cut away at their inner ends to form a relatively thin sleeve 82 thereon extending across the joint between the crank pin 18 and the cooperating throws 14 and 16. The thin sleeve portion 82 thus formed is of sufficient yieldability to insure perfect inter-engagement of the serrations 24 even though the bores 70 and 74 may be slightly mis-aligned with one another.

One of the nuts 78, illustrated at the righthand nut 78 in Fig. 1, is preferably provided with an axially extended pin, such as 84, received in a cooperating opening in the bottom of the corresponding enlargement or recess 72 so as to positively lock the nut 78 against rotation. The opposite nut, shown at the lefthand of nut 78 in Fig. 1, and the cooperating end of the stud 76 are preferably provided with one or more transverse openings such as 86 therethrough through which a cotter pin, wire or other locking means may be extended to lock the nut 78 against rotation with respect to the bolt 76. If desired, an opening such as 88 may be provided in the throw 14 with which the openings 86 in nut 78 and bolt 76 may be aligned in order to facilitate the application or removal of such locking wire or cotter pin.

It will be appreciated that by removing the lefthand nut 78, shown in Fig. 1, the bolt 76 and the righthand nut 78 may be readily removed, upon which the crank pin 18 may be shifted longitudinally of its serrations 24 and thus be removed from between the throws 14 and 16. It will also be appreciated that after the crank pin 18 has thus been removed, by removing the bolt 26 the throw 14 may be moved longitudinally of the serration 24 connecting it to the journal 10, and thereby be removed from the journal 10. Likewise the throw 16 may be removed from the associated journal 12 by removal of the bolt 50, and then shifting the throw 16 axially away from the journal 12 a sufficient distance to disengage either the throw 16 from the sleeve 64 or the sleeve 64 from the journal 12. Where bolts such as 26 are employed to connect both throws to their associated journals, then upon removal of the bolts and without removing the bolt 76 connecting the throws through the crank pin 18, the two throws and associated crank pin may be removed from the rest of the crankshaft by sliding the throws lengthwise of their associated serrations 24.

As will be appreciated, after the throws 14 and 16 have been removed, the journals 10 and 12 may be threaded axially of their bearings and removed from the space between them, or may be slid axially out of the end of the engine or associated structure. This construction, therefore, permits an engine or other device to be built employing solid bearings which may be formed integrally with the crankcase thereof and employing solid ends on the big ends of the connecting rods and still permit the same to be assembled and disassembled at will.

The feature of being able to remove the crank pin 18 makes it possible to employ any suitable metal in the connecting rod 22 and then form the crank pin 18 from a metal having suitable anti-friction characteristics with respect to the metal of the connecting rod and bearing directly in the bore of the big end of the connecting rod, thus eliminating the necessity of employing additional bearing elements as in modern engine constructions. For instance, where the connecting rod 22 is steel its big end may be bored out sufficiently smooth for a bearing surface and the crank pin 18 may be made of bronze, for instance, or other suitable metal, capable of operating satisfactorily though bearing directly upon the metal of the connecting rod. In such case, should the connection between the crankshaft and the connecting rod become worn, the crank pin 18 may be removed and replaced by a new crank pin of suitable dimensions to take up the wear and all this without necessitating dismantling the engine or removing the crankshaft as a whole from the engine. The same possibility, of course, exists between the crank pins 10 and 12 in their associated bearings.

It is ordinarily desirable that the big end 20 of the connecting rod 22 be of a width to substantially fit between the opposed faces of the throws 14 and 16 and such arrangement is illustrated in the drawings in Figs. 1 and 4. It will be noted that the serrations 24 on the throws 14 and 16 project outwardly beyond the corresponding planes of the throws so that when a connecting rod having a solid or unsplit big end is employed in such case and it is desired to remove the crank pin 18 with cooperating connecting rod 22, the two throws 14 and 16 must be separated axially a distance equal to the combined depth of the serrations 18 on the throws 14 and 16, in order to permit the big end of the connecting rod to pass between them. It will often be found that there is sufficient end play between the throws and the bearings for the main journals thereof to permit this to be done. However, where such end play is lacking, then resort may be had to the construction illustrated in Fig. 5, which is identical to that illustrated in the preceding figures except that the big end 20' of the connecting rod 22' there shown instead of fitting directly against the corresponding opposed faces of the throws 14 and 16 bears against the smooth inner faces of washers 90 which are interposed between each side of the big end 20' of the connecting rod 22', and the opposed face of the throws 14 and 16 about the crank pin 18. Also, in this case, the serrations 24 are increased in area to cover the full diameter of the big end of the connecting rod and the outer faces of the washers 90 are serrated in conformance therewith. The washers 90 are of slightly greater thickness than the depth of the serrations 24, so that when the bolt 76 and nuts 78 are removed, the assembly of the crank pin 18, connecting rod 22', and washers 90 may be slid out of position between the throws 14 and 16 in the direction of the length of the serrations 24 without the necessity of separating the throws 14 and 16 from one another axially of the crankshaft.

One reason why it is usually desirable for the big end 20 of the connecting rod 22 to have its axial faces contacting the throws 14 or 16, either directly or through the use of a washer such as 90 in Fig. 5, is to maintain the position of the connecting rod centrally of its crank pin 18. This may be accomplished by means other than actual direct contact with the throws or by use of a washer such as 90 shown in Fig. 5 and in a manner to permit removal of the crank pin 18 without separation of the throws 14 and 16. One method of accomplishing this is illustrated in Fig. 6 in which the construction of the crankshaft is identical to that illustrated in Fig. 1 but in which case the big end 20 of the connecting rod 22 is of a length axially of the bore thereof less than the distance between the bottoms of the serrations 24 at opposite ends of the crank pin 18, as shown. In this case the connecting rod 22 is maintained centrally of the crank pin 18 through its connection with the associated piston 100. Such piston is illustrated as being reciprocably mounted in the bore of a cylinder 102 the upper end of which is closed by a suitable or conventional cylinder head 104 having ports 106 and 108 for the ingress and egress of gas therefrom and which ports are suitably or conventionally controlled by means of valves 110. The piston 100 is internally provided with a pair of opposed piston pin bosses 112 which centrally receives the piston 114 therein. The small end 116 of the connecting rod 22 surrounds the piston pin 114 between the bosses 112 and is of such width as to substantially completely fill the space between the opposed ends of the bosses 112. Thus in this construction the bosses 112 cooperate with the connecting rod 116 to maintain it centrally therebetween and in this way the big end 20 of the connecting rod 22 is maintained centrally of the crank pin 18. The big end of the connecting rod being of less width than the distance between the bottoms of the serrations 24 at opposite ends of the crank pin 18, it will be appreciated that upon removal of one of the nuts 78 the other nut 78 and the pin 76 may be removed from the throws 14 and 16 in which case the crank pin 18 with the big end 20 of the connecting rod 22 surrounding it may be slid out from between the throws 14 and 16 in the direction of the length of the serrations 24 without requiring any separation whatever of the throws 14 and 16.

Another arrangement by means of which the crank pin 18 of the big end 20 of the connecting rod 22 may be slid out between the throws 14 and 16 without requiring separation of the throws 14 and 16 and without requiring the use of a washer such as 90 shown in Fig. 5 is illustrated in Figs. 7, 8, and 9. The construction shown in these figures is substantially identical to that illustrated in Fig. 1 except for the nature of the serrations on the throws, here shown as 14a and 16a, and consequently no explanation will be necessary except for these differences. In the construction illustrated in Figs. 7, 8 and 9 the opposed faces of the throws 14a and 16a may lie in a single plane, that is it is not necessary to provide a raised portion for the serrations as indicated in the first construction, although, of course, it will be obvious that this can be done if desired. In any case the serrations on the throws 14a and 16a in this case are extended completely across the face of the throws, as indicated in Fig. 8, and the serrations on the throws, here indicated at 24a, do not come to a point as in the constructions heretofore described but instead are truncated to a material extent so as to provide each one thereof with a flat face 120, best shown in Fig. 9. These flat faces 120 at the outer ends of the serrations 24a on each throw 14a or 16a lie in the same plane and such flat faces 120 may coincide with the plane of the corresponding face of the throw 14a or 16a. If desired they may be provided by simply failing to cut the serrations 24a into such face deep enough to bring the serrations to a point.

With the construction illustrated in Figs. 7, 8, and 9 the big end 20 of the connecting rod 22 is made of such axial width as to substantially fill the space between the flat surfaces 120 of the opposed throws 14a and 16a so that contact between the axial end faces of the big end 20 of the connecting rod 22 with such flat faces serves to maintain the big end of the connecting rod against axial movement on the associated crank pin 18. Thus in such construction, because of the fact that the big end 20 of the connecting rod 22 does not project axially beyond the inner edges of the serrations 24a on the throws 14a and 16a, upon removal of the nuts 82 and stud 76 from the throws 14a and 16a the crank pin 18 and the big end 20 of the connecting rod 22 may be slid out from between the throws 14a and 16a without separation of the throws from each other. The width of the flat surfaces 120 may be such that ample bearing surface is provided between the end faces of the big end 20 of the connecting rod 22 and such flat faces so as to eliminate any possibility of undue wear occurring between these parts. The serrations 24 in the end faces of the crank pin 18 may, of course, be the same as in the previously described construction and the depth of engagement of the serrations 24 and 24a will be amply sufficient for the purpose for which they are provided.

From the above it will be appreciated that the present invention provides a construction by means of which connecting rods having solid and unsplit big ends may be utilized in an internal combustion engine and in which any individual connecting rod in an engine may be removed therefrom with its associated crank pin and piston without disturbing any other part of the crankshaft, without removing any other part of the crankshaft from the engine, or disturbing any other connecting rod or associated part.

Formal changes may be made in the specific embodiments of the invention described without departing from the spirit or substance of the broad invention, the scope of which is commensurate with the appended claims.

What is claimed is:

1. In a crankshaft, in combination, a pair of main journals, a throw associated with each of said journals, a crank pin of substantially constant diameter throughout interconnecting said throws, each of said throws and its cooperating journal having abutting faces arranged in a plane substantially perpendicular to the axes of said journals, a multiplicity of complemental and interfitted serrations provided on said abutting faces, and removable means securing said throws against axial separation with respect to said journals, said serrations being parallel and extending across said faces from one side thereof to another whereby upon removal of said means said throws may be slid laterally out of engagement with said journals.

2. In a crankshaft, in combination, a pair of throws, a crank pin of substantially constant diameter throughout interconnecting said throws, each of said throws and said crank pin having abutting faces arranged in a plane substantially perpendicular to the axis of said crank pin, a multiplicity of complemental and interfitting serrations provided on said abutting faces, and removable means securing said throws against axial separation with respect to said crank pin, said serrations being parallel and extending across said faces from one side thereof to another side thereof whereby upon removal of said means said crank pin may be slid lengthwise of said serrations out of engagement with said throws.

3. In a crankshaft, in combination, a pair of main journals, a throw fixed to each of said main journals, a crank pin interconnecting said throws, said crank pin and said throws having abutting faces arranged in planes substantially perpendicular to the axis of rotation of said crankshaft and said main journals and their cooperating throws having abutting faces arranged substantially perpendicular to the axis of rotation of said crankshaft, complemental and interfitting curved and parallel serrations formed on all of said abutting faces and struck about a center beyond the periphery of said crank pin, and removable means clamping each pair of said abutting faces in axial engagement with each other.

4. In a crankshaft, in combination, a pair of main journals, a throw fixed to each of said main journals, a crank pin interconnecting said throws, said crank pin and said throws having abutting faces arranged in planes substantially perpendicular to the axis of rotation of said crankshaft and said main journals and their cooperating throws having abutting faces arranged substantially perpendicular to the axis of rotation of said crankshaft, complemental and interfitting serrations formed on all of said abutting faces, said serrations being parallel to each other and extending across said faces from one side thereof to another side thereof whereby said crank pin may be slid in the plane of said faces out of engagement with said throws without axial separation of said faces, removable means clamping each pair of said abutting faces in engagement with each other axially of said crank pin, and removable means cooperating with each pair of abutting faces for maintaining said faces against movement in the direction of length of said serrations thereon.

5. In a crankshaft, in combination, a pair of main journals, a throw fixed to each of said main journals, a crank pin interconnecting said throws, said crank pin and said throws having abutting faces arranged in planes substantially perpendicular to the axis of rotation of said crankshaft and said main journals and their cooperating throws having abutting faces arranged substantially perpendicular to the axis of rotation of said crankshaft, a multiplicity of curved, parallel, complemental and interfitting serrations formed on each pair of said abutting faces, removable means clamping said abutting faces in engagement with each other, means cooperating with each pair of abutting faces for maintaining said faces against movement in the direction of length of said serrations thereon, said journals, throws and crank pin having bores opening onto each of said faces and the bores in abutting faces being aligned with each other, and a readily yieldable sleeve received in each pair of said aligned bores in overlapping relation with respect to the plane of contact between the corresponding abutting faces serving to maintain the cooperating faces against lateral displacement in the direction of the length of the serrations thereon.

6. In a crankshaft, in combination, a pair of throws, a crank pin interconnecting said throws, said crank pin and said throws having abutting faces arranged substantially in a plane perpendicular to the axis of said crank pin, a multiplicity of serrations formed on each of said abutting faces, said serrations on opposed faces being complemental to each other and arranged in interfitting relationship, a washer element surrounding said crank pin at either end thereof, and serrations formed on a face of each of said washers complementary to and interfitting with the serrations on the corresponding of said throws.

7. In combination, a crankshaft including a pair of main journals and a throw associated with each thereof, a crank pin interposed between said throws in eccentric relation with respect to the axis of said main journals, said crank pin and said throws having opposed and abutting faces arranged in planes substantially perpendicular to the axis of said crank pin, serrations formed on said abutting faces, the serrations on each pair of abutting faces being complemental to each other and arranged in interfitting relationship and said serrations on said throws projecting outwardly from the general planes of the corresponding faces of said throws, a connecting rod surrounding said crank pin, and a washer surrounding said crank pin on either side of said connecting rod, and serrations formed on said washers in complementary relationship with respect to the serrations and the corresponding said throws and arranged in interfitting relationship with respect thereto, said washers being of sufficient thickness to substantially prevent movement of said connecting rod axially of said crank pin.

8. In combination, a pair of elements having abutting faces and aligned bores opening onto each other on said faces, a multiplicity of parallel serrations formed on said abutting faces and extending from one side thereof to another side thereof, said serrations on said abutting faces being complemental to each other and arranged into interfitting relationship, means acting perpendicularly to said faces for clamping said faces together, and a sleeve radially yieldable under the forces acting thereon transversely of the length of said serrations under the force of said clamping means closely received in said bores in overlapping relation to the plane of contact of said abutting faces for locking said elements against lateral movement in the direction of length of said serrations.

9. In combination, a pair of elements having abutting faces and aligned bores opening onto said faces, a multiplicity of parallel serrations formed on said abutting faces in complemental and interfitting relation with respect to each other, screw means projecting through said aligned bores, and a nut engaging one of said elements and threadably engaging said screw means for maintaining said elements against axial separation, and a sleeve portion on said nut arranged in bridging relation with respect to said abutting faces and received in said aligned bores thereby to lock said elements against lateral movement in the direction of length of said serrations, said sleeve portion being radially yieldable in a direction transverse to the length of said serrations whereby to permit full complementary seating of said serrations under the influence of said screw means and nut regardless of slight mis-alignment of said bores.

10. In combination, a crankshaft comprising a pair of throws, a crank pin of substantially constant diameter throughout interconnecting said throws, each of said throws and its cooperating crank pin having abutting faces arranged in a plane substantially perpendicular to the axis of said crank pin, a multiplicity of complemental and interfitting serrations provided on said abutting faces, removable means securing said throws against axial separation with respect to said crank pin, and a connecting rod rotatably surrounding said journal between said throws, said serrations being parallel and extending across said faces from one side thereof to another whereby upon removal of said means said throws and said connecting rod may be slid lengthwise of said serrations out of engagement with said journals.

11. In combination, an engine crankshaft comprising a pair of main journals, a throw fixed to each of said main journals, a crank pin of substantially constant diameter throughout interconnecting said throws, said crank pin and said throws having abutting faces arranged in planes substantially perpendicular to the axis of rotation of said crankshaft, and removable means clamping each pair of said abutting faces in axial engagement with each other, and a connecting rod rotatably embracing said crank pin, said abutting faces being provided with complementary and interfitting serrations extending across said faces in parallel relation with respect to each other, the serrations at one end of said crank pin being parallel to the serrations at the opposite end thereof whereby upon removal of said securing means said crank pin with said connecting rod surrounding the same may be slid lengthwise of said serrations outwardly from between said throws without material separation of said throws from one another.

12. In combination, an engine crankshaft comprising a pair of main journals, a throw fixed to each of said main journals, a crank pin of substantially constant diameter throughout interconnecting said throws, said crank pin and said throws having abutting faces arranged in planes substantially perpendicular to the axis of rotation of said crankshaft, and removable means clamping each pair of said abutting faces in axial engagement with each other, and a connecting rod rotatably embracing said crank pin, a multiplicity of parallel serrations on each face of said abutting faces extending from one side thereof to another side thereof, said serrations on each of said abutting faces having side faces complementary to the side faces of the serrations on the other thereof and said serrations on said abutting faces interfitting one another, said serrations at one end of said crank pin being parallel to said serrations at the opposite end thereof whereby upon removal of said securing means said crank pin with said connecting rod thereon may be slid in the direction of the length of said serrations from between said throws.

13. In combination, an engine crankshaft comprising a pair of main journals, a throw fixed to each of said main journals, a crank pin of substantially constant diameter throughout interconnecting said throws, said crank pin and said throws having abutting faces arranged in planes substantially perpendicular to the axis of rotation of said crankshaft, and removable means clamping each pair of said abutting faces in axial engagement with each other, and a connecting rod rotatably embracing said crank pin, a multiplicity of parallel serrations on each face of said abutting faces extending from one side thereof to another side thereof, said serrations on each of said abutting faces having side faces complementary to the side faces of the serrations on the other thereof and said serrations on said abutting faces interfitting one another, said serrations on each of said throws having flat outer faces all arranged in a common plane serving to provide a lateral abutment face for said connecting rod, said serrations at one end of said crank pin being parallel to those at the opposite end thereof whereby upon removal of said securing means said crank pin and said connecting rod thereon may be slid in the direction of length of said serrations from between said throws.

14. In combination, a crankshaft comprising a pair of throws, a crank pin of substantially constant diameter throughout interconnecting said throws, each of said throws and its cooperating crank pin having abutting faces arranged in a plane substantially perpendicular to the axis of said crank pin, a multiplicity of complemental and interfitting serrations provided on said abutting faces, removable means securing said throws against axial separation with respect to said crank pin, a connecting rod rotatably surrounding said journal between said throws, and means for maintaining said connecting rod centrally between said throws on said crank pin, said serrations being parallel and extending across said faces from one side thereof to another whereby upon removal of said means said throws and said connecting rod may be slid lengthwise of said serrations out of engagement with said journals.

JULIUS DUSEVOIR.